United States Patent
Johnston et al.

(10) Patent No.: US 7,401,198 B2
(45) Date of Patent: Jul. 15, 2008

(54) MAXIMIZING STORAGE SYSTEM THROUGHPUT BY MEASURING SYSTEM PERFORMANCE METRICS

(75) Inventors: Craig Anthony Johnston, Livermore, CA (US); Roger Keith Stager, Livermore, CA (US)

(73) Assignee: NetApp, Sunnyvale, CA (US)

( * ) Notice: Subject to any disclaimer, the term of this patent is extended or adjusted under 35 U.S.C. 154(b) by 300 days.

(21) Appl. No.: 11/244,523

(22) Filed: Oct. 6, 2005

(65) Prior Publication Data

US 2007/0083727 A1    Apr. 12, 2007

(51) Int. Cl.
*G06F 12/00* (2006.01)
(52) U.S. Cl. .................. 711/170; 711/114; 711/203
(58) Field of Classification Search ........... None
See application file for complete search history.

(56) References Cited

U.S. PATENT DOCUMENTS

| | | | |
|---|---|---|---|
| 4,635,145 A | 1/1987 | Horie et al. |
| 4,727,512 A | 2/1988 | Birkner et al. |
| 4,775,969 A | 10/1988 | Osterlund |
| 5,235,695 A | 8/1993 | Pence |
| 5,297,124 A | 3/1994 | Plotkin et al. |
| 5,438,674 A | 8/1995 | Keele et al. |
| 5,455,926 A | 10/1995 | Keele et al. |
| 5,485,321 A | 1/1996 | Leonhardt et al. |
| 5,666,538 A | 9/1997 | DeNicola |
| 5,673,382 A | 9/1997 | Cannon et al. |
| 5,774,292 A | 6/1998 | Georgiou et al. |
| 5,774,643 A | 6/1998 | Lubbers et al. |
| 5,774,715 A | 6/1998 | Madany et al. |
| 5,805,864 A | 9/1998 | Carlson et al. |
| 5,809,511 A | 9/1998 | Peake |
| 5,809,543 A | 9/1998 | Byers et al. |
| 5,854,720 A | 12/1998 | Shrinkle et al. |
| 5,864,346 A | 1/1999 | Yokoi et al. |
| 5,872,669 A | 2/1999 | Morehouse et al. |
| 5,875,479 A | 2/1999 | Blount et al. |
| 5,911,779 A | 6/1999 | Stallmo et al. |
| 5,949,970 A | 9/1999 | Sipple et al. |
| 5,961,613 A | 10/1999 | DeNicola |

(Continued)

FOREIGN PATENT DOCUMENTS

EP    1333379    4/2006

(Continued)

OTHER PUBLICATIONS

"Alacritus and Network Appliance Deliver Advanced Virtual Tape Library, Solution Shortens Backup Windows, Accelerates Data Recovery, and Simplifies Backup Management", Dec. 7, 2004, retrieved from www.thefreelibrary.com on Jan. 17, 2008.*

(Continued)

*Primary Examiner*—Kevin Verbrugge
(74) *Attorney, Agent, or Firm*—Volpe and Koenig, P.C.

(57) ABSTRACT

A method for stream allocation in a data storage system begins by determining whether a stream needs storage space. Storage space for the stream is requested, and a device on which to allocate the storage space is selected. The storage space on the selected device is allocated to the stream.

15 Claims, 10 Drawing Sheets

U.S. PATENT DOCUMENTS

| | | |
|---|---|---|
| 5,963,971 A | 10/1999 | Fosler et al. |
| 5,974,424 A | 10/1999 | Schmuck et al. |
| 6,021,408 A | 2/2000 | Ledain et al. |
| 6,023,709 A | 2/2000 | Anglin et al. |
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,061,309 A | 5/2000 | Gallo et al. |
| 6,067,587 A | 5/2000 | Miller et al. |
| 6,070,224 A | 5/2000 | LeCrone et al. |
| 6,098,148 A | 8/2000 | Carlson |
| 6,128,698 A | 10/2000 | Georgis |
| 6,131,142 A | 10/2000 | Kamo et al. |
| 6,131,148 A | 10/2000 | West et al. |
| 6,163,856 A | 12/2000 | Dion et al. |
| 6,173,359 B1 | 1/2001 | Carlson et al. |
| 6,195,730 B1 | 2/2001 | West |
| 6,225,709 B1 | 5/2001 | Nakajima |
| 6,247,096 B1 | 6/2001 | Fisher et al. |
| 6,260,110 B1 | 7/2001 | LeCrone et al. |
| 6,266,784 B1 | 7/2001 | Hsiao et al. |
| 6,269,423 B1 | 7/2001 | Kishi |
| 6,269,431 B1 | 7/2001 | Dunham |
| 6,282,609 B1 | 8/2001 | Carlson |
| 6,289,425 B1 | 9/2001 | Blendermann et al. |
| 6,292,889 B1 | 9/2001 | Fitzgerald et al. |
| 6,301,677 B1 | 10/2001 | Squibb |
| 6,304,880 B1 | 10/2001 | Kishi |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,336,173 B1 | 1/2002 | Day et al. |
| 6,339,778 B1 | 1/2002 | Kishi |
| 6,341,329 B1 | 1/2002 | LeCrone et al. |
| 6,343,342 B1 | 1/2002 | Carlson |
| 6,353,837 B1 | 3/2002 | Blumenau |
| 6,360,232 B1 | 3/2002 | Brewer et al. |
| 6,389,503 B1 | 5/2002 | Georgis et al. |
| 6,408,359 B1 | 6/2002 | Ito et al. |
| 6,487,561 B1 | 11/2002 | Ofek et al. |
| 6,496,791 B1 | 12/2002 | Yates et al. |
| 6,499,026 B1 | 12/2002 | Rivette et al. |
| 6,557,073 B1 | 4/2003 | Fujiwara |
| 6,557,089 B1 | 4/2003 | Reed et al. |
| 6,578,120 B1 | 6/2003 | Crockett et al. |
| 6,615,365 B1 | 9/2003 | Jenevein et al. |
| 6,625,704 B2 | 9/2003 | Winokur |
| 6,654,912 B1 | 11/2003 | Viswanathan et al. |
| 6,658,435 B1 | 12/2003 | McCall |
| 6,694,447 B1 | 2/2004 | Leach et al. |
| 6,725,331 B1 | 4/2004 | Kedem |
| 6,766,520 B1 | 7/2004 | Rieschl et al. |
| 6,779,057 B2 | 8/2004 | Masters et al. |
| 6,779,058 B2 | 8/2004 | Kishi et al. |
| 6,779,081 B2 | 8/2004 | Arakawa et al. |
| 6,816,941 B1 | 11/2004 | Carlson et al. |
| 6,816,942 B2 | 11/2004 | Okada et al. |
| 6,834,324 B1 | 12/2004 | Wood |
| 6,850,964 B1 | 2/2005 | Brough et al. |
| 6,877,016 B1 | 4/2005 | Hart et al. |
| 6,915,397 B2 | 7/2005 | Lubbers et al. |
| 6,931,557 B2 | 8/2005 | Togawa |
| 6,950,263 B2 | 9/2005 | Suzuki et al. |
| 6,973,369 B2 | 12/2005 | Trimmer et al. |
| 6,973,534 B2 | 12/2005 | Dawson |
| 6,978,325 B2 | 12/2005 | Gibble |
| 7,032,126 B2 | 4/2006 | Zalewski et al. |
| 7,055,009 B2 | 5/2006 | Factor et al. |
| 7,072,910 B2 | 7/2006 | Kahn et al. |
| 7,096,331 B1 | 8/2006 | Haase et al. |
| 7,100,089 B1 | 8/2006 | Phelps |
| 7,111,136 B2 | 9/2006 | Yamagami |
| 7,127,388 B2 | 10/2006 | Yates et al. |
| 7,152,077 B2 | 12/2006 | Veitch et al. |
| 7,155,586 B1 | 12/2006 | Wagner et al. |
| 7,266,668 B2 * | 9/2007 | Hartung et al. ............. 711/202 |
| 2001/0047447 A1 | 11/2001 | Katsuda |
| 2002/0004835 A1 | 1/2002 | Yarbrough |
| 2002/0016827 A1 | 2/2002 | McCabe et al. |
| 2002/0026595 A1 | 2/2002 | Saitou et al. |
| 2002/0095557 A1 | 7/2002 | Constable et al. |
| 2002/0144057 A1 | 10/2002 | Li et al. |
| 2002/0163760 A1 | 11/2002 | Lindsey et al. |
| 2002/0166079 A1 | 11/2002 | Ulrich et al. |
| 2002/0199129 A1 | 12/2002 | Bohrer et al. |
| 2003/0004980 A1 | 1/2003 | Kishi et al. |
| 2003/0037211 A1 | 2/2003 | Winokur |
| 2003/0120476 A1 | 6/2003 | Yates et al. |
| 2003/0120676 A1 | 6/2003 | Holavanahalli et al. |
| 2003/0126388 A1 | 7/2003 | Yamagami |
| 2003/0135672 A1 | 7/2003 | Yip et al. |
| 2003/0149700 A1 | 8/2003 | Bolt |
| 2003/0182301 A1 | 9/2003 | Patterson et al. |
| 2003/0182350 A1 | 9/2003 | Dewey |
| 2003/0188208 A1 | 10/2003 | Fung |
| 2003/0217077 A1 | 11/2003 | Schwartz et al. |
| 2003/0225800 A1 | 12/2003 | Kavuri |
| 2004/0015731 A1 | 1/2004 | Chu et al. |
| 2004/0044705 A1 * | 3/2004 | Stager et al. ................ 707/204 |
| 2004/0098244 A1 | 5/2004 | Dailey et al. |
| 2004/0181388 A1 | 9/2004 | Yip et al. |
| 2004/0181707 A1 | 9/2004 | Fujibayashi |
| 2005/0010529 A1 | 1/2005 | Zalewski et al. |
| 2005/0044162 A1 | 2/2005 | Liang et al. |
| 2005/0063374 A1 | 3/2005 | Rowan et al. |
| 2005/0065962 A1 | 3/2005 | Rowan et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |
| 2005/0076070 A1 | 4/2005 | Mikami |
| 2005/0076261 A1 | 4/2005 | Rowan et al. |
| 2005/0076262 A1 | 4/2005 | Rowan et al. |
| 2005/0076264 A1 | 4/2005 | Rowan et al. |
| 2005/0114598 A1 * | 5/2005 | Hartung et al. ............. 711/114 |
| 2005/0144407 A1 | 6/2005 | Colgrove et al. |
| 2006/0047895 A1 | 3/2006 | Rowan et al. |
| 2006/0047902 A1 | 3/2006 | Passerini |
| 2006/0047903 A1 | 3/2006 | Passerini |
| 2006/0047905 A1 | 3/2006 | Matze et al. |
| 2006/0047925 A1 | 3/2006 | Perry |
| 2006/0047989 A1 | 3/2006 | Delgado et al. |
| 2006/0047998 A1 | 3/2006 | Darcy |
| 2006/0047999 A1 | 3/2006 | Passerini et al. |
| 2006/0143376 A1 | 6/2006 | Matze et al. |

FOREIGN PATENT DOCUMENTS

| | | |
|---|---|---|
| EP | 1 671231 | 6/2006 |
| WO | WO99/03098 | 1/1999 |
| WO | WO99/06912 | 2/1999 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Alacritus Software's Securitus I: Pointing the Way to Virtual Tape Libraries" Aberdeen Group, Inc., Mar. 2002.

"Continuous Data Protection: Business Continuity for the Era of Networked Storage: An Executive White Paper" Aberdeen Group, Inc., Jul. 2003.

"Alacritus Software's Chronospan: Make Time for Continuous Data Protection" Aberdeen Group, Inc., Oct. 2003.

Hill, David "Alacritus Software's Securitus: Defining the Way to Virtual Tape Libraries" Aberdeen Group, Inc., Jul. 2003.

"Alacritus Software's Securitus: Defining the Way to Virtual Tape Libraries" Aberdeen Group, Inc., Jul. 2003.

"Product Brief: Rhapsody/Alacritus-Secritus/XPath Virtual Tape in the Fabric" The Enterprise Storage Group, Aug. 2002.

"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.

"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library Support for Legato NetWorker Data Protection Solution" Alacritus Software, Inc., Jan. 8, 2002.

Camphuisen, Alicia, "Hitachi Inks OEM Deal with Legato" Knapp Comm., Jul. 17, 2002.

"Alacritus Announces Disk-Based Successor to Tape" Knapp Comm., Aug. 21, 2002.

Biggar, Heidi, "Alacritus Enables Disk-Based Backup" InfoStor, Sep. 2001.

"Securitus I White Paper: Disk Based Data Protection from Alacritus Software" Alacritus Software, Inc., Jul. 2001.

"Alacritus Software FAQs" Alacritus Software, Inc., Jul. 2001.

"Disk-Based Data Protection" Alacritus Software, Inc., Jul. 2001.

"Virtual Tape Library Technology Brochure" Alacritus Software, Inc., Jul. 2001.

"Disk-Based Data Protection" Alacritus Software, Inc., Sep. 2001.

"Disk-Based Data Protection" Alacritus Software, Inc., Sep. 2002.

Payack, Paul JJ, "Alacritus Lines Up OEM Partners for Virtual Tape Library Push" The (451) Storage & Systems, Oct. 4, 2002.

Payack, Paul JJ, "Alacritus Software Announces Continuous Data Protection with New Chronospan Technology" Oct. 28, 2003.

Payack, Paul JJ, "Alacritus Software Announces New Customers for Securitus VTLA" Alacritus Software, Jan. 13, 2004.

Baltazar, Henry "Weaving Apps Into SAN Fabric" eWEEK, Mar. 24, 2003.

Baltazar, Henry "More Intelligence is on the Way" eWEEK, Sep. 15, 2003.

Barrett, Alex "The Case for Network Smarts" Storage Magazine, Jun. 2003.

"Securitus White Paper: Disk Based Data Protection from Alacritus Software" Alacritus Website, Oct. 2003.

"Manageability: Securitis v. Tape" Alacritus Website, Oct. 2003.

"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.

"No Changes Required: Securitus v. Tape" Alacritus Website, Oct. 2003.

"Customer Success" Alacritus Website, Oct. 2003.

"Chronospan" Alacritus Website, Oct. 2003.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Biggar, Heidi, "Disk and Tape Forge New Partnership in Backup Arena" InfoStor, Nov. 2001.

Preston, W. Curtis, "Surprise! Cheap Disks Cure Slow Backup" Storage Magazine, Jun. 1, 2002.

"Alacritus, Hitachi CP and Nissho Team to Create Virtual Tape Library" internetnews.com, Jun. 25, 2001.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.

Komiega, Kevin, "Vendor Pushes Disk Backup Over Tape" SearchStorage.com Jan. 10, 2003.

"Testimonials" Alacritus Website, Oct. 2003.

"Seamless Integration" Alacritus Website, Oct. 2003.

"Topologies" Alacritus Website, Oct. 7, 2003.

"Securitus" Alacritus Website, Oct. 2003.

"Scalability: Securitus v. Tape" Alacritus Website, Oct. 2003.

"Strengths: Securitus v. Tape" Alacritus Website, Oct. 2003.

"Alacritus Creates 'Next Critical Step' in Disaster Recovery for Patrick Air Force Base, Securitus VTL Sets the Pace", Apr. 20, 2004.

"Alacritus to Demonstrate Chronospan CDP with the Brocade Fabric Application Platform at Storage Networking World", Apr. 1, 2004.

"Alacritus to Demo Chronospan Continuous Data Protection with the Cisco MDS 9000", Apr. 1, 2004.

"Alacritus and Network Appliance Deliver Advanced Virtual Tape Library, Solution Shortens Backup Windows, Accelerates Data Recovery, and Simplifies Backup Management", Dec. 7, 2004.

"Cisco and Storage ISVs to Demo Protocol-Based Interface between Storage Appliances and the Cisco MDS 9000", Mar. 30, 2004.

"Case Study Shizuoka-ken Noukyou Densan Center K.K., Reducing Management Costs Through Tapeless Backup At An iDC", Apr. 7, 2004.

* cited by examiner

Input Limited

Output Limited

MAXIMIZING STORAGE SYSTEM THROUGHPUT BY MEASURING SYSTEM PERFORMANCE METRICS

FIELD OF INVENTION

The present invention generally relates to data storage systems, and more particularly, to maximizing disk usage by measuring system performance metrics and selecting an appropriate destination device to send data based on the measured metrics.

BACKGROUND

The term "stream" as used herein refers to a sequence of discrete input/output (IO) commands from a single initiator targeted toward a single virtual destination, with each command carrying a certain amount of data.

When a storage system has multiple independent data streams, it is important to distribute the streams among the various connected storage devices in order to maximize the overall system throughput. The factors which are involved in selecting the "best" individual storage device include the current usage of all of the available devices and the current usage of the paths through which the data travels on its way to each device. The hardware paths include the system memory bus, the system peripheral buses (e.g., PCI bus), the host adapter card, the external peripheral buses (e.g., FC or SCSI bus), and the controllers of the storage devices. The software paths include the application, the device driver, the operating system's "mid-level" (e.g., the portion of the operating system that defines internal interfaces and provides common services between the application and the device drivers), and the host adapter driver. Trying to compute the bandwidth of each of these path components and determining the impact of the data streams on that bandwidth is difficult. The concepts of "input limited" and "output limited" can be used to help assess where a bottleneck exists in the system.

As shown in FIG. 1A, when the rate at which data is passed to a device is less than the device's ability to consume the data, that device is referred to as being input limited. A device is input limited when the total input rate is less than the potential output rate. Adding additional input increases the throughput of the device.

Referring to FIG. 1B, when the input data rate exceeds the device's output rate (i.e., when the input data rate is greater than the device's ability to consume data), that device is referred to as being output limited. Adding additional input does not increase the device's throughput. A device can become output limited when any component of the path to the device is unable to pass the available data at the rate it is being supplied. Once that occurs, each new command must wait for previous commands to move past the limiting component before they can be completed. Because the commands "stack up" this way, the command completion time increases significantly as soon as the device becomes output limited.

Previous load balancing logic assumed that the storage devices and paths were always input limited, and assigned new streams to the device and path that had the lowest use in terms of throughput (e.g., megabytes (MB) per second). This caused heavily loaded disks to appear more attractive, since the overall throughput decreases once the device becomes output limited. This approach created a problem in that by looking only for the device having the lowest throughput, streams would be continuously added to the output limited device.

A potential solution includes recording the path information and the bandwidth of each path component to attempt to track the impact of the streams on each path component. This approach has several problems in terms of complexity and accuracy, since the path components through which the data travels have to be determined, and there is no way to determine the amount of the total bandwidth that is in use by others.

SUMMARY

The present invention uses measured system metrics as a criterion for selecting among storage devices and paths to a storage device, in order to maximize the overall throughput of the storage system. One embodiment uses the command completion time, because it is simple to determine and an accurate indicator of overall system delay. The present invention utilizes load balancing to assist in maximizing the total throughput of the system. As used herein, the term "load balancing" does not necessarily equate to a fair distribution of a work load between available devices, but rather relates to the concept of maximizing the throughput of the system.

A method for stream allocation in a data storage system begins by determining whether a stream needs storage space. Storage space for the stream is requested, and a device on which to allocate the storage space is selected. The storage space on the selected device is allocated to the stream.

A method for selecting a device to use in a data storage system begins by determining if there is an unused device in the system. If an unused device exists in the system, then the unused device is selected. If there are no unused devices in the system, then a determination is made whether there is an input limited device in the system. If an input limited device exists in the system, then the input limited device having a lowest amount of traffic is selected. If there are no input limited devices in the system, then the device having a lowest command completion time is selected.

A system for determining the length of time for command execution in a data storage system includes a command queue, a command processor, and a timer. The command queue provides commands to be processed. The command processor is connected to the command queue, processes each command, and sends a command reply to the command queue. The timer is connected to the command queue, and marks a first time, when a command is sent from the command queue to the command processor, and a second time, when the command reply is received at the command queue. The length of time for command execution is determined by subtracting the first time from the second time.

A method for switching streams between devices in a data storage system begins by determining a size of a new stream and classifying the new stream based on its size. A determination is made if any unused devices exist in the system and if there are any unused devices, the new stream is assigned to an unused device if the new stream is larger than average. If there are no unused devices in the system, the new stream is assigned to an input limited device if the new stream is smaller than average.

A system for performing load balancing in a data storage system having a plurality of storage devices includes a command queue, a device driver, a statistics device, and a device allocator. The command queue is configured to process commands and the device driver is configured to send commands to the plurality of storage devices. The statistics device is configured to gather statistics from the device driver regarding command completion times. The device allocator is configured to allocate space on one of the plurality of storage devices based on the gathered statistics, whereby the data storage system is load balanced.

BRIEF DESCRIPTION OF THE DRAWINGS

A more detailed understanding of the invention may be had from the following description, given by way of example, and to be understood in conjunction with the accompanying drawings, wherein.

DETAILED DESCRIPTION OF THE PREFERRED EMBODIMENTS

The description of the present invention generally discloses a disk-based storage system. However, the principles of the present invention are equally applicable to any type of storage media, and for purposes of description, the terms "device" and "disk" are used interchangeably herein.

Figure 1A:
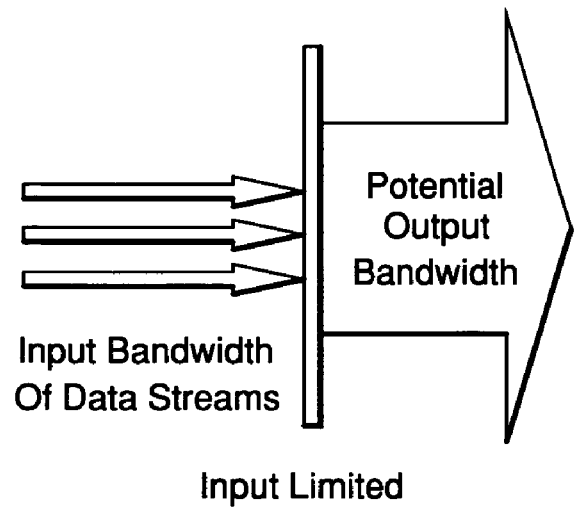
FIG. 1A is a diagram of a prior art "input limited" device.
Figure 1B:
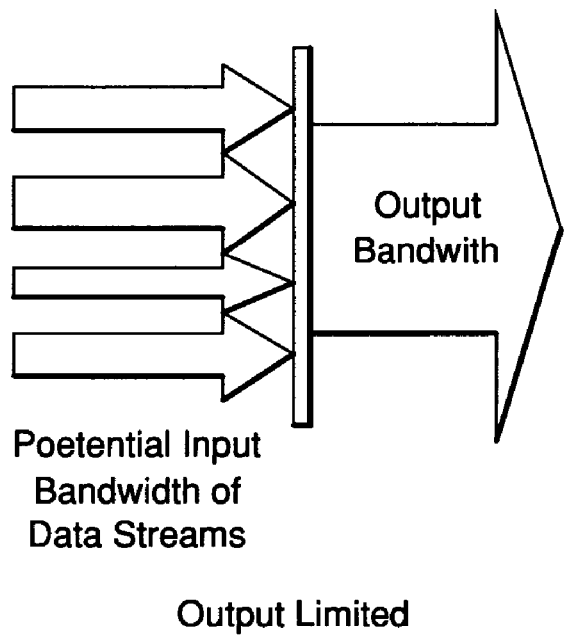
FIG. 1B is a diagram of a prior art "output limited" device.
Figure 2A:
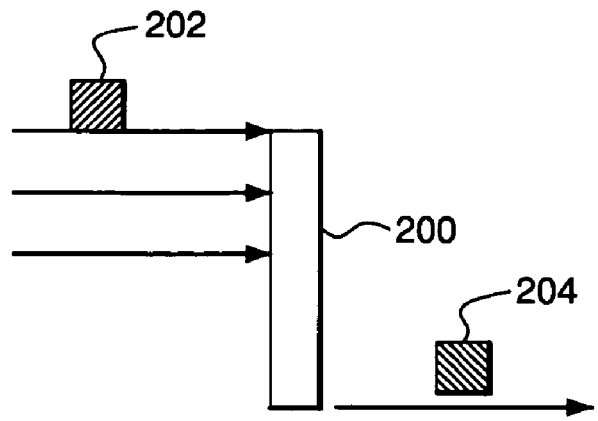
FIG. 2A is a diagram showing command processing in a queue in an input limited device.
Figure 2B:
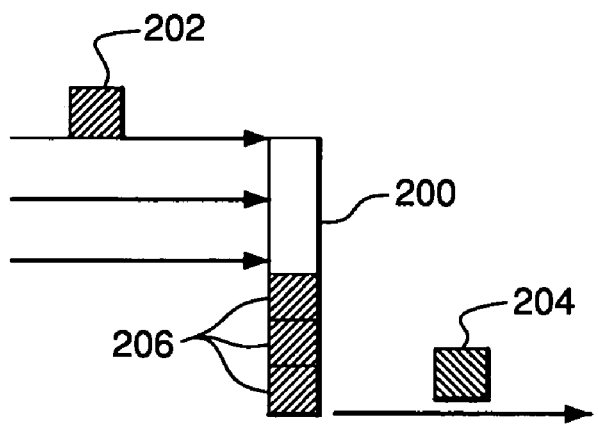
FIG. 2B is a diagram showing command processing in a queue in an output limited device.

Referring to FIGS. 2A and 2B, a data path can also be viewed as a command queue 200. As shown in FIG. 2A, when the path is input limited, the command queue 200 is empty and an incoming command 202 on one of the data streams can be processed as soon as it arrives, as shown by "processed" command 204. As shown in FIG. 2B, when the path is output limited, commands 206 are waiting in the queue 200 as a new command 202 arrives and the arriving command 202 will be delayed until the earlier commands 206 have been processed, as shown by processed command 204. The time it takes for the command 202 to be processed is the metric that the load balancing uses to determine the path on which to send the next portion of the data stream.

Initial Device Selection

The present invention includes two aspects: initial device selection and switching streams between devices. With respect to initial device selection, the command completion time is related to the amount of data associated with the command. The length of time that it would take the data to be transferred on a bus to the disk (which can be determined by dividing the size of the data associated with the command by the bus data transfer speed) is subtracted from the calculation. The desired statistic is the length of time from the time a command is originated until the time that the originating device learns of the command's completion. This statistic will show any delays along the path from the originating device to the destination device. By subtracting out the data transfer time, the difference in execution time between a small command and a large command (as determined by the amount of data associated with the command) can be eliminated.

Figure 3:
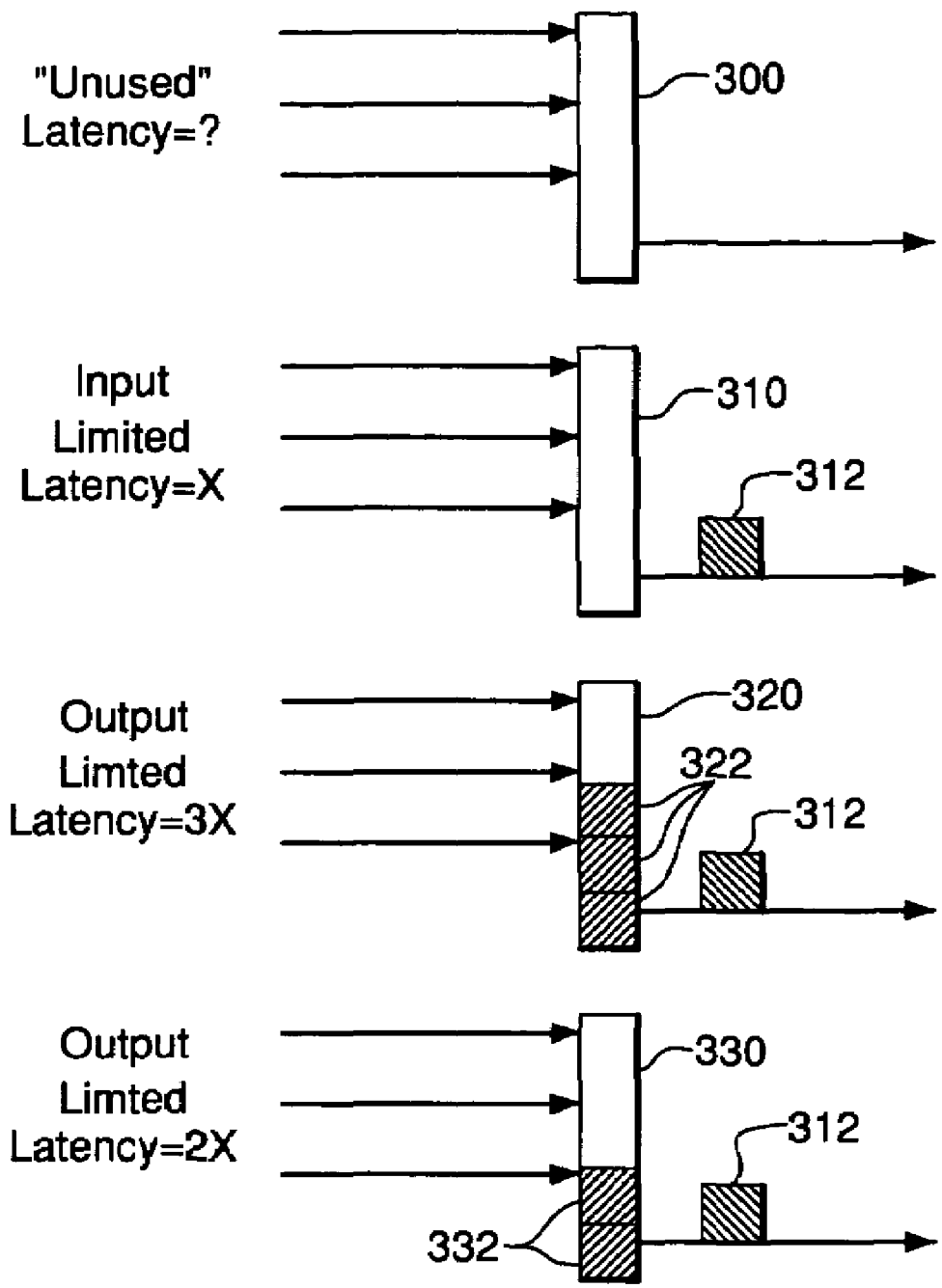
FIG. 3 is a diagram showing latency in different queues for input limited and output limited devices.

FIG. 3 shows the selection of the best path based on latency. In the event that a path fails (not shown in FIG. 3), the failed path is removed from the set of available paths prior to the load balancing logic evaluating that path. An unused path 300 has an unknown latency, and is assumed to be less than any active path. Therefore, an unused path 300 is the first choice. An input limited path 310 has a latency of X time units, with a time unit being the amount of time needed to process a command 312. It would be the second choice if all paths are active. Output limited paths 320, 330 have a latency that is directly related to the number of commands 322, 332 already waiting (i.e., the queue depth).

The load balancing logic in accordance with the present invention determines the path with the lowest latency and, within the set of devices that are available for use, sets the following preferences to assign a stream to a device:

1) Devices that are not currently being used by other streams.

2) Input limited devices with the smallest aggregate usage.

3) Output limited devices, starting with the smallest average command completion time and sequentially assigning an output limited device with the next smallest average command completion time.

Figure 4:
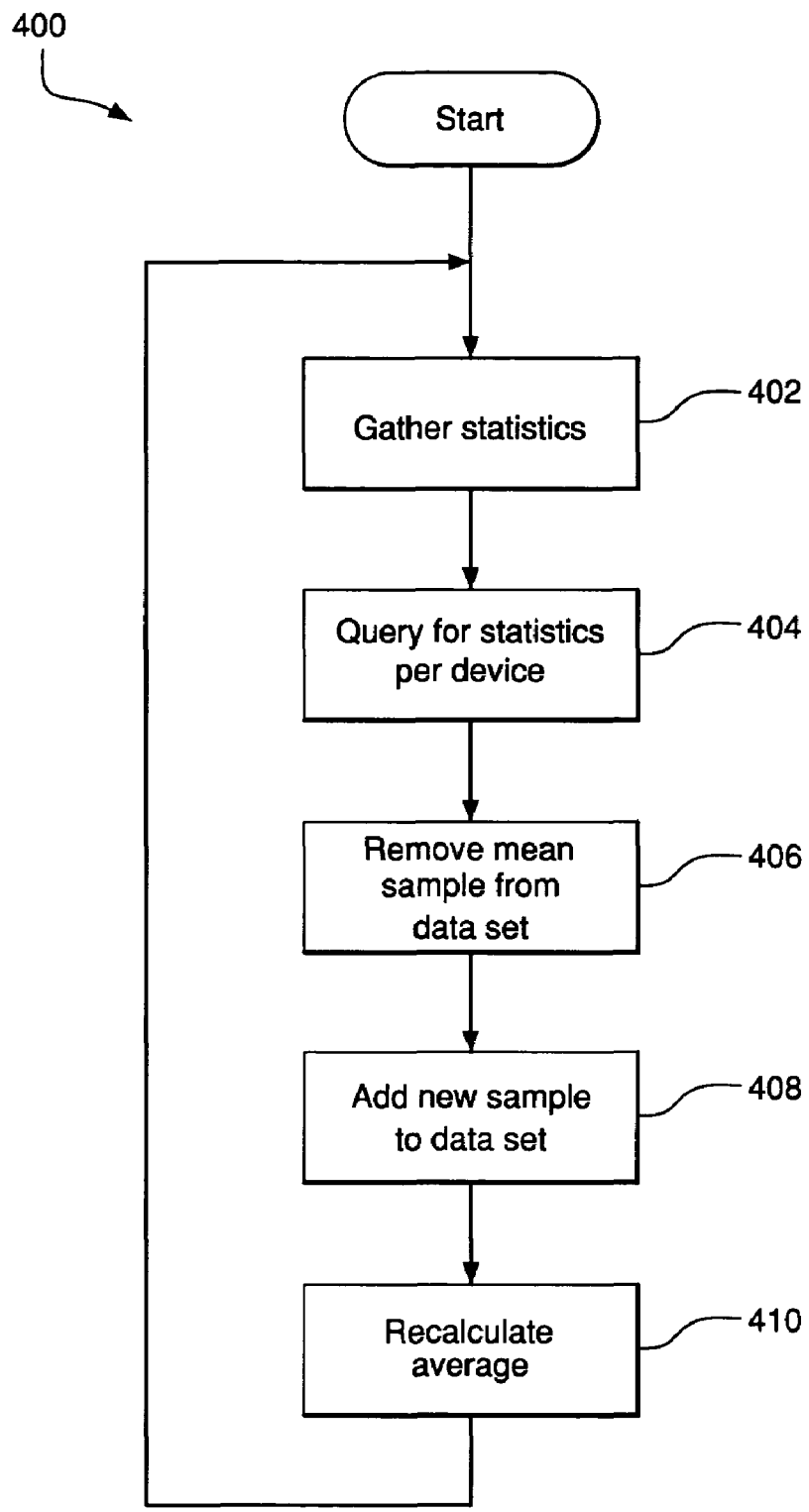
FIG. 4 is a flowchart of a method for averaging command completion time statistics.

A flowchart of a method 400 for averaging command completion time statistics for a device is performed by the load balancing logic and is shown in FIG. 4. The statistics for a device are gathered (step 402) and a query is made for the statistics from the device (step 404). A mean sample is removed from the data set used to calculate the running average (step 406). The mean sample is determined by averaging logic, which smoothes the data by maintaining a running total (T) of the past N samples. The mean sample removed is the value T/N. The new sample from the statistics is added to the data set (step 408) and the average is recalculated (step 410). The method 400 then returns to step 402 to continuously update the average command completion time for the device.

The method 400 applies a low pass filter-like approach to averaging the data set. The new sample is added to the data set and the average sample is removed "from the other end". In one embodiment, three samples are maintained in the data set. This approach to calculating the average minimizes any radical movement of the average, because an average sample is removed from the data set rather than the lowest or highest sample.

The decision of which device to select is based on a history of the devices, including a balancing of short term considerations versus long term considerations. In the short term (over a small number of samples), it is desirable to have the most recent statistics for purposes of routing streams. In the long term, it is desirable to know the drift in command completion time per device over time. These two considerations are somewhat conflicting, in that it is desirable to smooth out the samples to attempt to eliminate noise, but at the same time it is also desirable to be able to quickly respond to actual changes as evidenced by the samples.

A device is classified as input limited or output limited based on the average command completion time, with a special case of input limited being where a device is not in use. This classification uses Equation 1:

$$\text{Amount of time command takes} \times \text{Measured data transfer rate} = X \quad \text{Equation (1)}$$

A device is input limited if $X \leq 1$, and a device is output limited if $X > 1$.

In the event that the value for the measured data rate is not known when Equation 1 is evaluated, it is assumed that a new stream will have a transfer rate equal to the average transfer rate of all of the active streams on a device. This assumption is made in order to complete the calculation.

Figure 5:
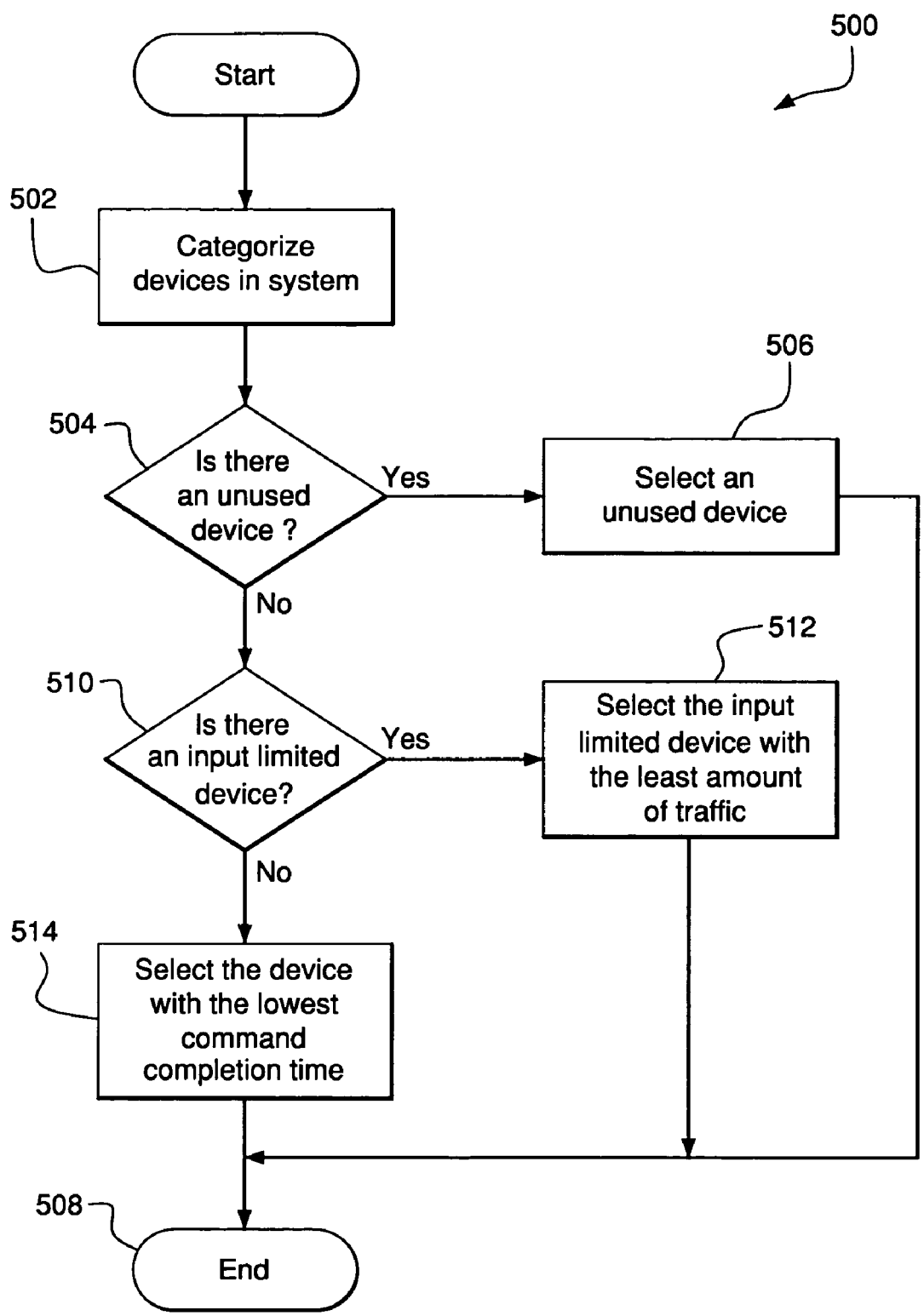
FIG. 5 is a flowchart of a method for device selection.

A method 500 for selecting a device is performed by the load balancing logic and is shown in FIG. 5. The method 500 begins by categorizing all of the devices in the system as unused, input limited, or output limited (step 502). A determination is made whether there is an unused device in the system (step 504). If there is an unused device, then an unused device is selected (step 506) and the method terminates (step 508). If there are no unused devices, then a determination is made whether there are any input limited devices (step 510). If there are input limited devices, then an input limited device with the least amount of traffic is selected (step 512) and the method terminates (step 508). If there are no input limited devices, then the device with the lowest command completion time is selected (step 514) and the method terminates (step 508).

Exemplary Hardware Implementation

Figure 6:
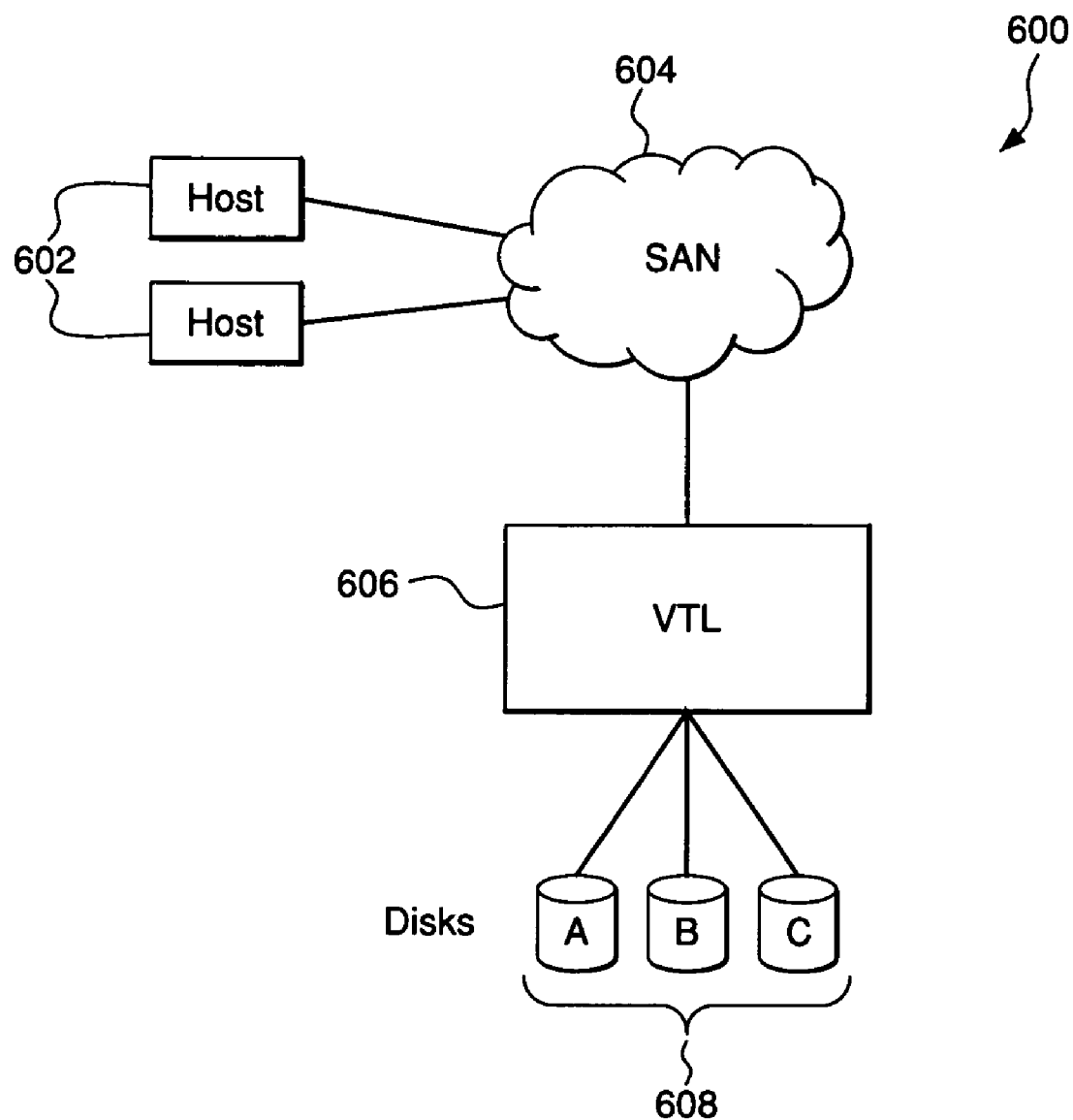
FIG. 6 is an overview of a data storage system.

FIG. 6 shows a storage system 600, in which a backup application running on a host 602 sends data over a storage area network (SAN) 604 to a Virtual Tape Library (VTL) 606 and the VTL 606 selects a disk 608 on which to store the data. While the present invention is described in connection with a VTL, the invention is equally applicable to any disk-based repository.

Figure 7:
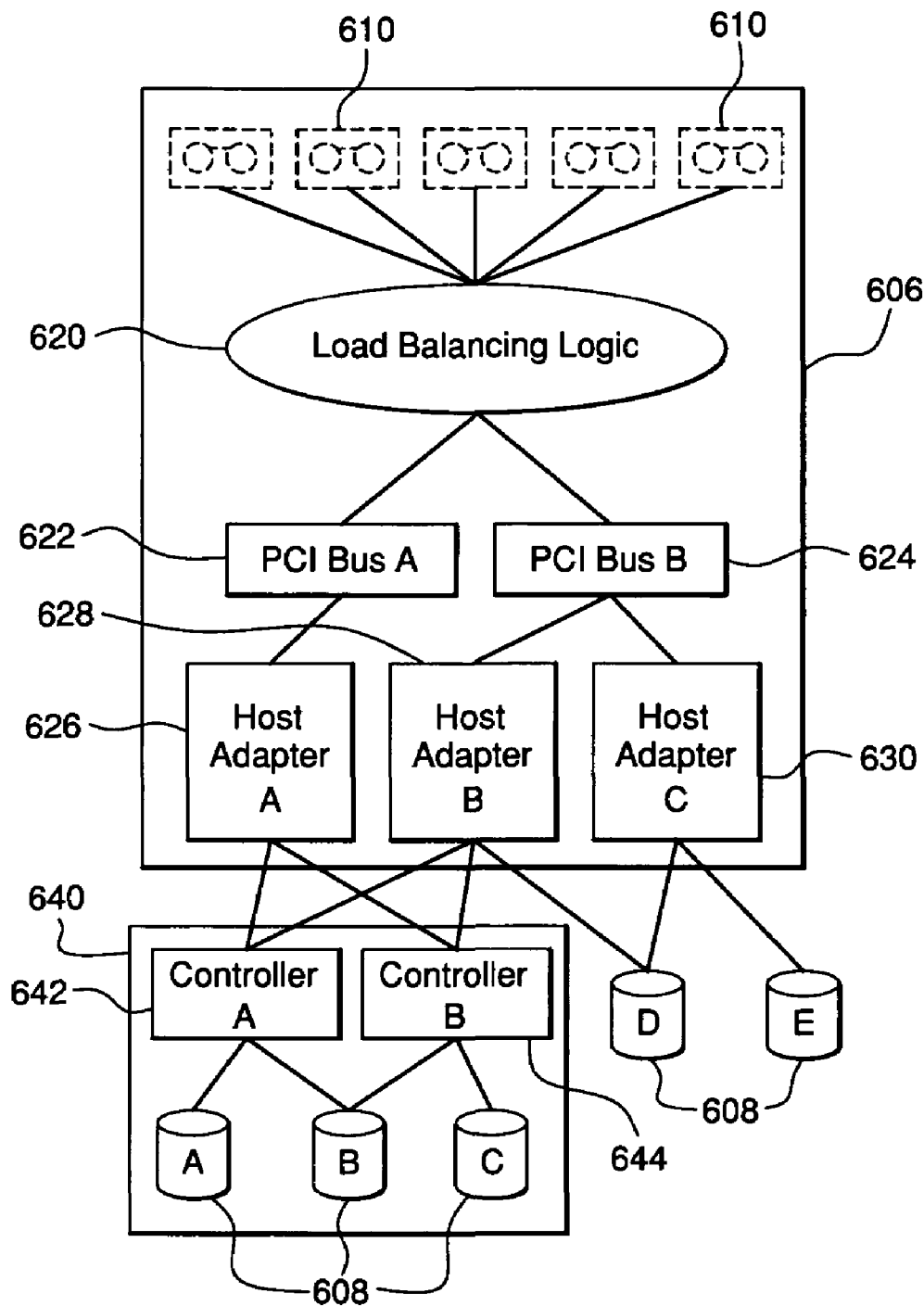
FIG. 7 is a diagram showing data paths through the data storage system shown in FIG. 6.

FIG. 7 shows additional detail of the VTL 606 and the interaction with the disks 608. The VTL 606 includes a plurality of virtual tape drives 610 which feed into a load balancing logic 620 via a plurality of data streams. The load balancing logic 620 selects the disk 608, and the path to the disk 608, on which to record a portion of each data stream.

Each path passes through elements of the system 600 that may be shared with other paths. These elements can include, for example, PCI Bus A 622 and PCI Bus B 624; host adapters 626, 628, 630; an enclosure 640 for multiple disks 608; and disk controllers 642, 644. Each of the elements along a path has a rate at which it can pass data, referred to as the "bandwidth" of the element. The bandwidth of an element is shared by all of the paths passing through that element and provides an aggregate limit on all of the paths passing through that element.

Rather than attempting to determine the bandwidth of each element and the portion of that bandwidth already in use, as is performed by existing systems, the present invention measures the time each command takes on each of the active paths. That time, or latency, increases as more data streams are added and the available bandwidth of each element has to be shared. When multiple streams exist, statistics are taken across all streams currently assigned to different devices. The location for adding a new stream is based on what the other streams are doing at the time the new stream is added. The description of the present invention is in terms of command execution time, but additional criteria for expressing the latency, such as the queue depth, may also be used.

Since a stream consists of multiple commands, the amount of time that the system needs to complete execution of a command can be used as a measure of the delay of a stream. Statistics regarding system operation are collected, including the length of time each command takes to complete, the amount of data transferred per command, and the number of commands processed. These statistics are used to calculate the average completion time for each device/path.

Figure 8:
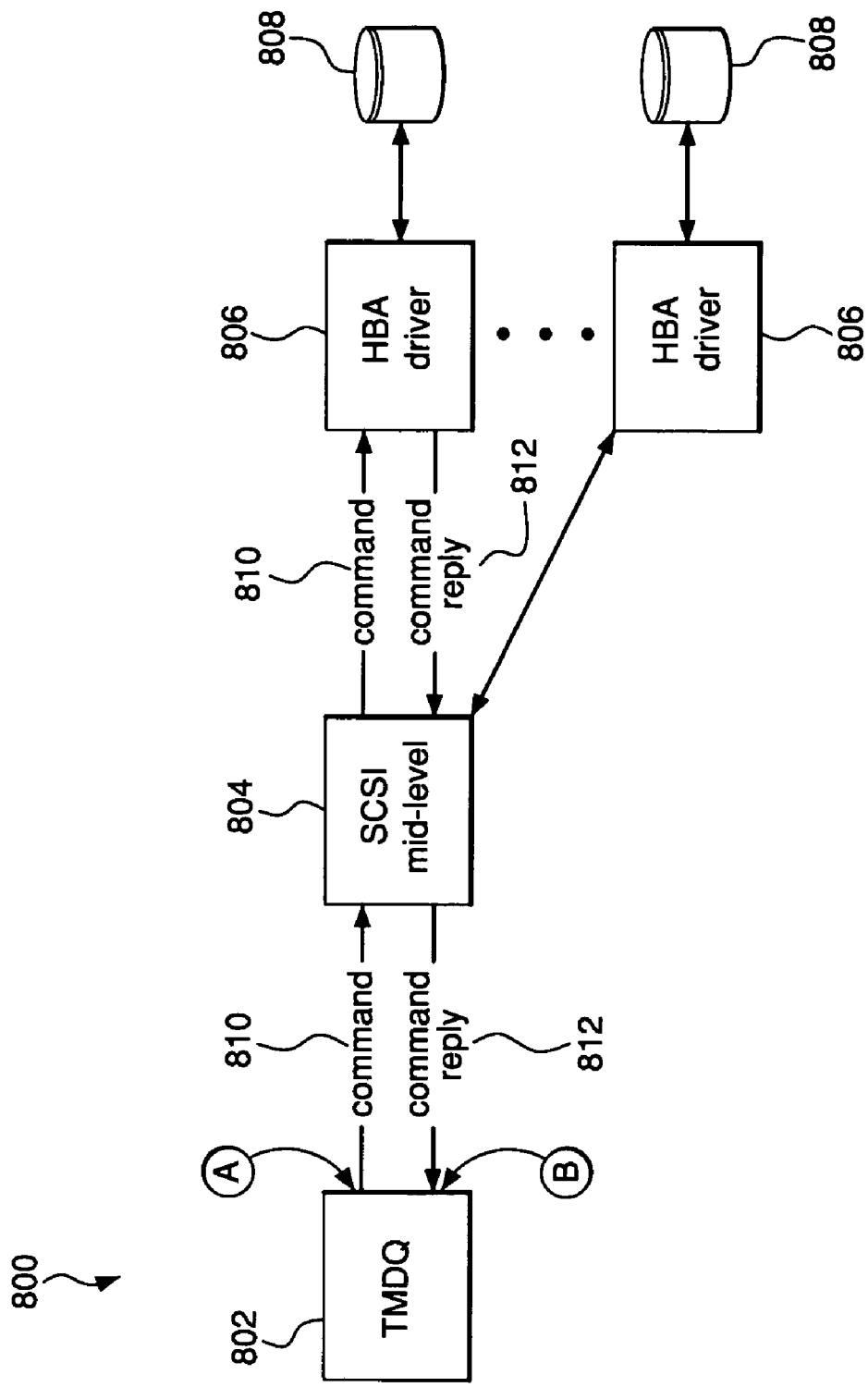
FIG. 8 is a diagram of system operation while determining command execution duration.

FIG. 8 is an overview of a system 800 that implements the present invention. The system 800 includes a target mode driver queue (TMDQ) 802, a SCSI mid-level unit 804, at least one host bus adapter (HBA) driver 806, and a disk 808 connected to each HBA driver 806. In operation, the TMDQ 802 receives a stream of commands to be processed, queues the commands for processing, and initiates the processing for each command. The TMDQ 802 sends a command 810 to the SCSI mid-level unit 804, at a specific time noted by point A. The SCSI mid-level unit 804 in turn sends the command 810 to an HBA driver 806 for processing (e.g., reading or writing to the disk 808). Once the HBA driver 806 has completed processing the command 810, it responds with a command reply 812 which is passed through the SCSI mid-level 804 to the TMDQ 802 at a time noted by point B. The command completion time is determined by subtracting the time at point A from the time at point B.

Each command is time-stamped by a central processing unit's (CPU's) time-stamp counter (i.e., the number of CPU "clicks") when the command is sent out for execution. When the command is completed, the current time is checked, and the departure time for the command is subtracted, to obtain the length of time that it took to complete the command. The command completion time is added to a running average for each device.

Figure 9:
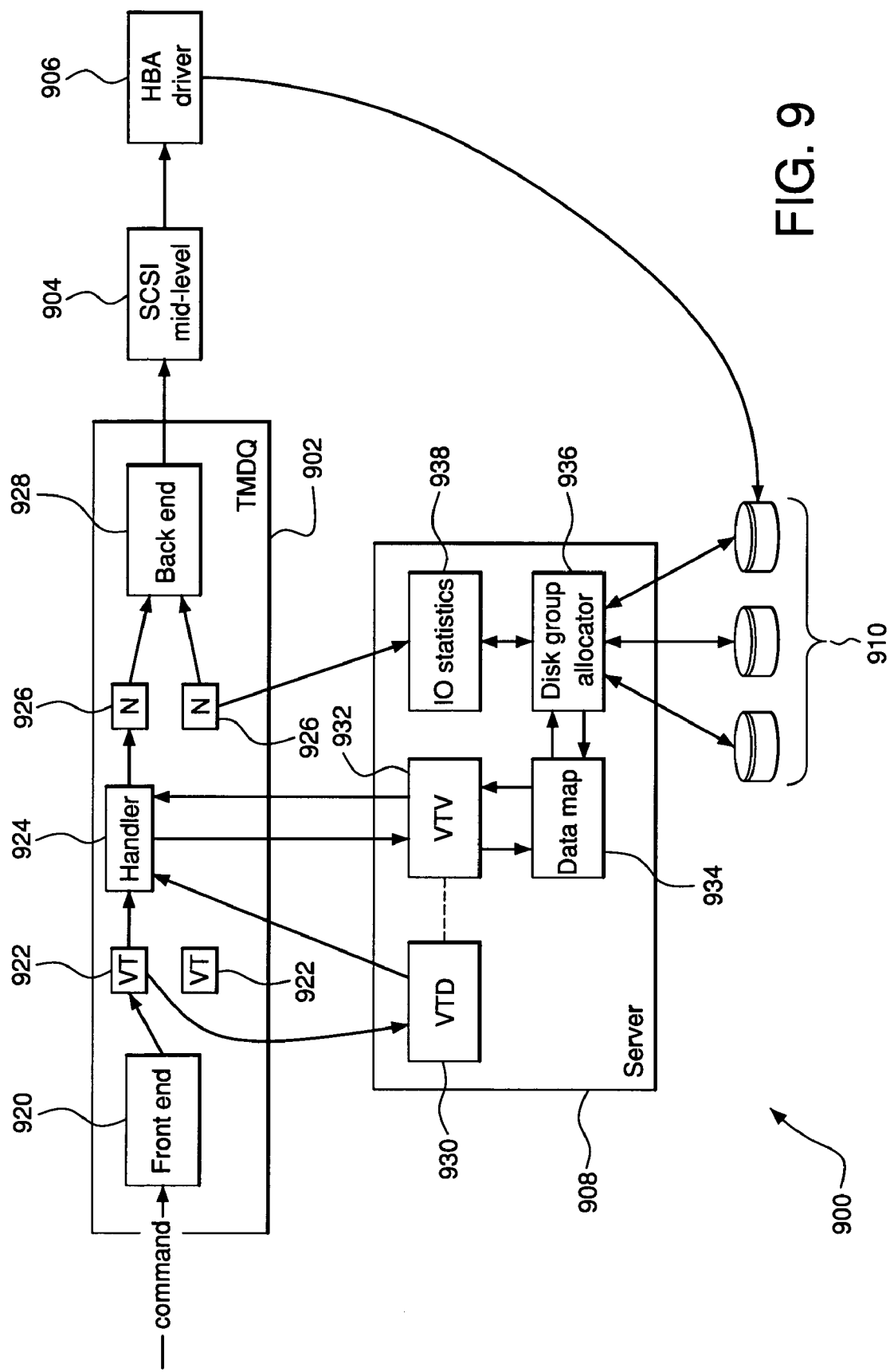
FIG. 9 is a diagram of the operation of the system shown in FIG. 8 when requesting a new stream.

FIG. 9 shows additional detail of the system 800 shown in FIG. 8. The system 900 includes a TMDQ 902, a SCSI mid-level unit 904, an HBA driver 906, a server 908, and a plurality of disks 910. The TMDQ 902 includes a front end device 920, one or more virtual targets (VT) 922, a handler 924, one or more statistic-gathering nodes 926, and a back end device 928. The server 908 includes a virtual tape device (VTD) 930, a virtual tape volume (VTV) 932, a data map 934, a disk group allocator (DGA) 936, and an IO statistics device 938.

A command from a host adapter driver (not shown) is input to the TMDQ 902 via the front end device 920 and is passed to a VT 922. The VT 922 checks whether it has a handler for the command. If the VT 922 does not have a handler for the command, the VT 922 sends a message to the VTD 930 requesting how the command should be handled. The VTD 930 is capable of handling all command types, and it instantiates an appropriate handler 924 for the VT 922.

The handler 924 is pointed to the VTV 932. A link between the VTV 932 and the VTD 930 is established when a tape or other storage medium is loaded into a drive. The handler 924 gathers data in a buffer to write to the back end device 928 (the remainder of the description of FIG. 9 assumes that the command is a write command). The handler 924 sends a message to the VTV 932 requesting disk space for the write command.

The VTV 932 passes the request for disk space to the data map 934. If the data map 934 has no space to allocate, it requests the DGA 936 for additional disk space. The DGA 936 requests statistics from the IO statistics device 938, which continuously pulls statistics from the nodes 926, wherein each node represents a path to a device. In one embodiment, a node is a segment of server code that periodically collects information from the device driver pertaining to command completion times, the number of IOs that have been performed, the amount of data that has been transferred (e.g., the number of bytes read or written), and other similar statistics. In one embodiment, the statistics are pulled from the IO statistics device 938 on a periodic basis, for example once every five seconds.

Upon retrieving the statistics, the DGA 936 determines the best disk on which to allocate space. After determining the best disk, the DGA 936 passes the device identifier, an offset onto the disk 910 where the write command is to begin, and a length of the allocated space to the data map 934. The data map 934 passes this information to the handler 924, which in turn passes the information to the back end 928 where the write command is sent out for execution to the SCSI mid-level 904 and via the HBA driver 906 to a disk 910.

The process is repeated each time the TMDQ 902 requests additional storage space.

Switching Streams Between Devices

After a device has been selected according to the method 500, data is sent to the selected device. The method 500 allocates disk space in 1 GB segments, which is a sufficiently large allocation to lower the number of messages exchanged in the system. It is noted that the 1 GB value is an arbitrary value, and one skilled in the art could implement the present invention by using any allocation size.

When the 1 GB segment is exhausted and the stream contains commands to be processed, additional disk space must be allocated to satisfy the remaining commands in the stream. Each time a new allocation is triggered (by exhausting the 1 GB segment), the load balancing determines the location of the best device and the new stream is assigned to the best location. This may result in switching the newly allocated portion of the stream to a different device. In these terms, the concept can be viewed as putting a stream in different (i.e., non-contiguous) locations on a disk by the load balancing logic.

To avoid excessive switching between disks, the following four numbered rules may be employed to limit movement of data streams between disks. It is noted that while four preferred rules are provided below, any type and/or number of rules may be utilized when implementing the present invention. These rules are applied when the stream needs additional disk space for storage, using information gathered by a continuously running process that queries the driver on a periodic basis. For example, as described in connection with FIG. 9, the statistics-gathering nodes are continuously updated, and the IO statistics device periodically pulls the statistics from the nodes. This continuously running process (e.g., running in the IO statistics device) is started when the appliance is booted and runs until the appliance is stopped.

The particular location of a bottleneck in the throughput of the system is not critical; it is sufficient to know the specific portion of the path that is output limited. The decision where to place a stream (i.e., where to fill disk space) may be a weighted decision, and is not necessarily load balancing. There are instances where the weighting will be adjusted towards keeping multiple streams together on a single disk, instead of spreading the streams across multiple disks. Keeping the streams in a single disk can help in disaster recovery scenarios by limiting the number of missing volumes in the event of a disk failure.

1) If a device becomes unused (i.e., completely empty), the largest stream from any output limited device is assigned to the unused device. If it is not possible to determine the largest stream, a larger than average stream from the current output limited device is assigned to the unused device. A large stream will not be moved from an output limited device to an input limited device. The reason for this is that when a data stream is on an output limited device, that stream may not be processing data at its full capacity, and moving that stream could increase the throughput for the stream. If this occurs, an input limited device could become an output limited device just by adding the one stream. This would create an effect of toggling between two different output limited devices, and would not result in an overall system throughput gain, which is the goal of switching the streams.

Because the decision to move a stream is made on a stream by stream basis, it may not be feasible to locate the largest stream to move. It is possible to know any level of detail about the entire system, but this requires a place to store that knowledge so it is available when the decision to move a stream is made. In order to avoid that complexity, the present invention makes decisions based on the current stream and the average streams. "Larger than average" and "smaller than average" refer to the transfer rate for the current stream and the average transfer rate for all of the streams using that device. The number of streams using a device is tracked to determine that average, which is calculated according to Equation 2.

$$\text{Average transfer rate} = \frac{\text{total transfer rate for the device}}{\text{number of streams}} \quad \text{Equation (2)}$$

2) Assign the smallest stream from an output limited device to an input limited device. If it is not possible to determine the smallest stream, move a smaller than average stream from the output limited device.

3) Move the smallest, or a smaller than average, stream from one output limited device to another output limited device only if the difference in command completion times is large. When moving a stream from an output limited device, it is known that the stream will become larger (since it was output limited), but it is not known how much larger the stream will become. A smaller than average stream can be moved if the total amount of the remainder of space on the current device is greater than the total amount of space on the disk the stream will be moved to. Satisfying this criteria guarantees that switching the stream will not cause the destination device to become output limited upon switching the stream.

4) Do not move streams between input limited devices. By definition, an input limited device is consuming data as fast as the stream can provide it, so no additional benefit is found by moving streams from an input limited device.

Figure 10:
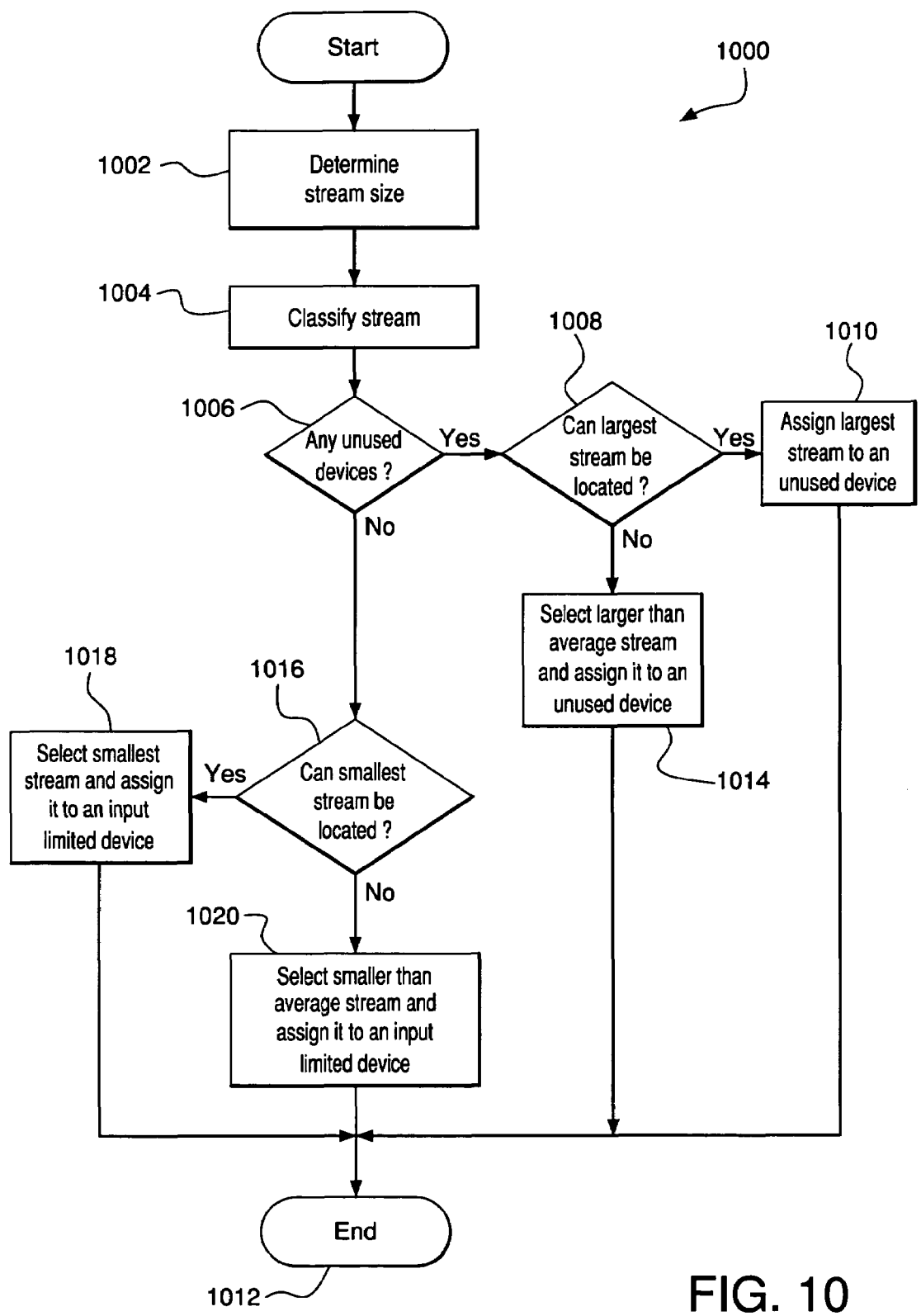
FIG. 10 is a flowchart of a method for switching streams between devices.

FIG. 10 is a flowchart of a method 1000 for switching streams between devices. The method 1000 is used once an allocation for a new stream has been triggered (i.e., when additional storage space is needed), and begins by determining the size of the new stream (step 1002) and classifying the new stream as average-sized, larger than average, or smaller than average (step 1004). A determination is made whether there are any unused devices in the system (step 1006). If there is at least one unused device in the system, a determination is made whether the largest stream can be located (step 1008). If the largest stream can be located, then the largest stream is assigned to an unused device (step 1010) and the method terminates (step 1012). If the largest stream cannot be located, then a larger than average stream is selected and is assigned to an unused device (step 1014) and the method terminates (step 1012).

If there are no unused devices in the system (step 1006), then a determination is made whether the smallest stream can be located (step 1016). If the smallest stream can be located, then the smallest stream is selected and is assigned to an input limited device (step 1018) and the method terminates (step 1012). If the smallest stream cannot be located, then a smaller than average stream is selected and is assigned to an input limited device (step 1020) and the method terminates (step 1012).

It is noted that the method 1000 is an exemplary application of the rules, and that one skilled in the art could implement the rules in a different order to achieve the same result.

As described above, the path load balancing performed by the present invention does not necessarily incorporate path fairness. In path fairness, each device would have the same number of streams; for example, if there are four devices and eight streams, each device would receive two streams. However, path fairness is not related to the capacity of the device. As a further example, if there are three small streams, the streams can all be placed on one input limited device or each stream can be placed on a different input limited device. In both cases, the overall throughput would be the same. While path fairness is not required, it may be implemented for user perception reasons, in that a user may not think the system is "load balanced" if all three streams are on the same disk.

The principles of the present invention may also be applied to performing load-balancing on any input-limited or output-limited resource whose bandwidth may be required by users of that resource. Although the features and elements of the present invention are described in the preferred embodiments in particular combinations, each feature or element can be used alone (without the other features and elements of the preferred embodiments) or in various combinations with or without other features and elements of the present invention.

The above discussion details one or more possible embodiments of the invention, although these are merely examples and are not intended to limit the scope of claimed subject matter. As another example, an alternative embodiment may be implemented in hardware, software, firmware, or any combination of hardware, software, and/or firmware. Likewise, although the claimed subject matter is not limited in scope in this respect, one embodiment may comprise one or more articles, such as a storage medium or storage media, such as one or more CD-ROMs and/or disks, that may have stored thereon instructions that when executed by a system, such as a computer system, computing platform, or other system or device, may result in an embodiment of a method in accordance with the claimed subject matter being executed, such as one of the embodiments previously described. Furthermore, a processor may be implemented as a general-purpose, multi-purpose, or dedicated microprocessor, controller, application-specific integrated circuit (ASIC), or other equivalent device or devices, and a memory may be implemented as one or more memories, such as static random access memory, dynamic random access memory, flash memory, and/or a hard drive, although, again, the claimed subject matter is not limited in scope to this example. It will, of course, be understood that although particular embodiments have been described, the claimed subject matter is not limited in scope to a particular embodiment or implementation.

What is claimed is:

1. A method for stream allocation in a data storage system, comprising the steps of:
    determining whether a stream needs storage space;
    requesting storage space for the stream;
    selecting a device on which to allocate the storage space, including
        determining if there is an unused device in the system;
        selecting the unused device if an unused device exists in the system;
        if there are no unused devices in the system, then
            determining if there is an input limited device in the system; and
            selecting an input limited device having a lowest amount of traffic if an input limited device exists in the system; and
    allocating the storage space on the selected device to the stream.

2. The method according to claim 1, wherein the method is used to allocate additional storage space to an existing stream.

3. The method according to claim 1, wherein the determining step includes a trigger being activated to indicate that storage space is needed.

4. The method according to claim 3, wherein the trigger is activated by a stream exhausting its allocated storage space.

5. The method according to claim 1, wherein the determining step includes:
    determining a length of time a command on the device requires for completion;
    measuring a data transfer rate of the device;
    multiplying the length of time by the data transfer rate to obtain a value; and
    determining that the device is input limited if the value is less than or equal to one.

6. The method according to claim 1, wherein if there are no input limited devices in the system, then the selecting step further includes:
    selecting a device having a lowest command completion time.

7. A method for selecting a device to use in a data storage system, comprising the steps of:
    (a) determining if there is an unused device in the system;
    (b) selecting the unused device if an unused device exists in the system;
    (c) determining if there is an input limited device in the system if there are no unused devices in the system;
    (d) selecting an input limited device having a lowest amount of traffic if an input limited device exists in the system; and
    (e) selecting a device having a lowest command completion time if there are no input limited devices in the system.

8. The method according to claim 7, wherein step (c) includes:
    determining a length of time a command on the device requires for completion;
    measuring a data transfer rate of the device;
    multiplying the length of time by the data transfer rate to obtain a value; and
    determining that the device is input limited if the value is less than or equal to one.

9. A system for performing load balancing in a data storage system having a plurality of storage devices, the system comprising:
    a command queue configured to process commands;
    a device driver configured to send commands to the plurality of storage devices;
    a statistics device configured to gather statistics from said device driver regarding command completion times; and
    a device allocator configured to allocate space on one of the plurality of storage devices based on the gathered statistics, whereby the data storage system is load balanced.

10. The system according to claim 9, wherein said command queue includes:
    a command handler configured to process a command; and
    a statistics-gathering node configured to gather statistics from said device driver regarding command completion times, said statistics device requesting statistics from said statistics-gathering node.

11. The system according to claim 10, wherein said command queue further includes:
    a virtual target configured to determine whether said command handler can process the command, said virtual target further configured to request an appropriate command handler if said command handler cannot process the command.

12. The system according to claim 11, further comprising:
a virtual tape device configured to process any command type and configured to instantiate a command handler in said command queue upon request of said virtual target.

13. The system according to claim 10, further comprising:
a virtual tape volume configured to request space on one of the plurality of storage devices, said command handler communicating with said virtual tape volume to request space needed by the command.

14. The system according to claim 13, further comprising:
a data map configured to allocate a portion of the space in the plurality of storage devices.

15. The system according to claim 14, wherein if said data map has no space to allocate, said data map is further configured to request additional space in the plurality of storage devices from said device allocator.

* * * * *